(12) United States Patent
Hess et al.

(10) Patent No.: US 9,537,370 B2
(45) Date of Patent: Jan. 3, 2017

(54) HAND-HELD MACHINE TOOL WITH FAN ARRANGEMENT

(71) Applicant: C. & E. FEIN GMBH, Schwäbisch Gmünd-Bargau (DE)

(72) Inventors: Achim Hess, Korb (DE); Uwe Früh, Sonnenbühl (DE); Jürgen Blickle, Göppingen (DE)

(73) Assignee: C. & E. FEIN GMBH, Schwäbisch Gmünd-Bargau (DE)

( * ) Notice: Subject to any disclaimer, the term of this patent is extended or adjusted under 35 U.S.C. 154(b) by 0 days.

(21) Appl. No.: 14/384,532

(22) PCT Filed: Apr. 22, 2013

(86) PCT No.: PCT/EP2013/001205
§ 371 (c)(1),
(2) Date: Sep. 11, 2014

(87) PCT Pub. No.: WO2013/159902
PCT Pub. Date: Oct. 31, 2013

(65) Prior Publication Data
US 2015/0054361 A1    Feb. 26, 2015

(30) Foreign Application Priority Data

Apr. 24, 2012   (DE) .................. 10 2012 103 603

(51) Int. Cl.
*H02K 7/14*    (2006.01)
*H02K 9/06*    (2006.01)
(Continued)

(52) U.S. Cl.
CPC ............. *H02K 7/145* (2013.01); *B23Q 11/127* (2013.01); *B25F 5/008* (2013.01); *B25F 5/02* (2013.01); *H02K 9/06* (2013.01)

(58) Field of Classification Search
CPC ............ H02K 7/14; H02K 7/145; H02K 9/06; B26B 19/28; B23Q 11/127; B25F 5/008; B25F 5/02
(Continued)

(56) References Cited

U.S. PATENT DOCUMENTS 2,155,082 A * 4/1939 Decker ................... 173/217
3,903,440 A * 9/1975 Paule ................ B23B 45/001
                                                  310/50
(Continued)

FOREIGN PATENT DOCUMENTS

CN         1853871 A      11/2006
CN        10200697 A       4/2011
(Continued)

OTHER PUBLICATIONS

International Bureau's English translation of the international preliminary report on patentability (Chapter I) for PCT/EP2013/001205.
(Continued)

*Primary Examiner* — Joshua Benitez Rosario
*Assistant Examiner* — Alexander Singh
(74) *Attorney, Agent, or Firm* — Benesch Friedlander Coplan & Aronoff LLP (57) ABSTRACT

Hand-held machine tool having an outer housing extending substantially along a longitudinal axis, with an electric drive unit accommodated in this outer housing, and with a tool arrangement which is disposed at a first end of the electric drive unit. The outer housing of the machine tool has a defined inner contour and the electric drive unit and the tool arrangement have a defined outer contour. The outer contour and the inner contour of the outer housing are at a predetermined minimum spacing from each other. At least one inlet opening for cooling air is disposed in an end region of
(Continued)

the outer housing. The electric drive unit drives a fan arrangement which draws in through the at least one inlet opening cooling air which flows substantially parallel to the rotational axis of the electric drive unit through the machine tool and flows out of the outer housing to the outside at the outer contour of the machine tool.

9 Claims, 4 Drawing Sheets

(51) Int. Cl.
*B25F 5/02* (2006.01)
*B23Q 11/12* (2006.01)
*B25F 5/00* (2006.01)

(58) Field of Classification Search
USPC .......................................... 310/47, 50, 51–58
See application file for complete search history.

(56) References Cited

U.S. PATENT DOCUMENTS

| | | | | |
|---|---|---|---|---|
| 6,102,632 | A * | 8/2000 | Potter et al. | 408/124 |
| 6,543,549 | B1 * | 4/2003 | Riedl et al. | 173/216 |
| 8,698,362 | B2 * | 4/2014 | Esenwein et al. | 310/62 |
| 2004/0263008 | A1 * | 12/2004 | Voigt | B25F 5/008 310/58 |
| 2011/0148227 | A1 * | 6/2011 | Schuele | B25F 5/008 310/50 |
| 2012/0086290 | A1 * | 4/2012 | Ivarsson | A61C 17/221 310/50 |

FOREIGN PATENT DOCUMENTS

| | | |
|---|---|---|
| DE | 19730356 A1 | 1/1999 |
| DE | 102004056679 A1 | 5/2006 |
| DE | 102007017243 A1 | 10/2008 |
| DE | 102008000613 A1 | 9/2009 |
| DE | 102008041370 A1 | 2/2010 |
| EP | 1491290 A1 | 12/2004 |
| GB | 2459191 A * | 10/2009 |

OTHER PUBLICATIONS

International Search Report for PCT/EP2013/001205.
Chinese Office Action for Chinese Application No. 201380021516.8 mailed on Jul. 3, 2015.
International Search Report for German Application No. 10 2012 103 603.9.

* cited by examiner

HAND-HELD MACHINE TOOL WITH FAN ARRANGEMENT

The present invention concerns a hand-held machine tool, particularly a hand-held oscillation machine tool, having an outer housing extending essentially along a longitudinal axis and a fan arrangement.

From the state of the art, hand-held machine tools with fan arrangements are known, in which a drawn-in flow of cooling air is separated into several flows of cooling air by means of guiding arrangements, wherein these several flows of cooling air are guided through different regions of the housing of the machine tool, which is widely sealed with respect to the environment apart from the cooling air inlet and outlet openings. Furthermore, hand-held machine tools are known, in which dirt particles can be removed from the drawn-in cooling air by means of deflection or filter arrangements. Such guiding or deflection arrangement guiding or deflection arrangements increase flow resistance and thereby power demand of the fan arrangement.

The underlying task of the invention is providing a hand-held machine tool with an improved ventilation concept.

This is achieved by the teaching of the independent claim. Preferred embodiments of the invention are subject of the dependent claims.

A hand-held machine tool according to the invention can particularly also be a hand-held oscillation machine tool. Such a hand-held machine tool comprises an outer housing essentially extending along a longitudinal axis and having a gripping region which is provided for engaging and for guiding the machine tool by means of a hand of a user. Essentially within this outer housing, an electric drive unit is accommodated, which rotatively drives a driveshaft of the machine tool. Thereby, the axis of rotation of the driveshaft is aligned essentially parallel to a longitudinal axis of the outer housing or can also coincide with said longitudinal axis. The tool arrangement, which is arranged at a first end portion of the outer housing, is essentially rigidly coupled to the electric drive unit. Thereby, the tool arrangement can be arranged directly at a first end of the electric drive unit. It is equally possible, that the tool arrangement is arranged at a different arrangement, as exemplarily a fan arrangement, which is preferably also essentially rigidly coupled to the electric drive unit. In the context of the present invention, rigidly coupled means that these arrangements are mechanically coupled, and movements, also of the high frequency type, like exemplarily vibrations, are directly transmitted from one to the other element. A rigid connection can thus also be formed with an integral construction or similar.

The outer housing of the hand-held machine tool according to the invention comprises a defined inner contour. Accordingly, the electric drive unit and the tool arrangement which is rigidly coupled thereto comprise a defined outer contour, wherein the tool arrangement comprises a defined outer contour at least insofar as it is arranged in the area of the outer housing. Insofar further arrangements having an outer contour extends between the electric drive unit and the tool arrangement are arranged between the electric drive unit and the tool arrangement, as exemplarily a fan arrangement, said further arrangement equally constitutes a part of the defined outer contour without being explicitly named in the following, respectively. The outer contour of the drive elements and the inner contour of the outer housing are formed such that they are at a predetermined minimum spacing from each other.

The tool arrangement serves for transmission of the drive torque of the electric drive unit to a tool preferably arranged at the tool arrangement. For transmission of drive power of the electric drive unit to a tool, the tool arrangement can comprise different elements as gear boxes, couplings or similar, which heat up during operation. Both, the electric drive unit and the tool arrangement should not exceed a predetermined temperature during operation, in order to avoid overheating of the drive elements themselves on the one hand and of outer areas of the tool machine on the other hand.

As well as the tool arrangement, the electric drive unit can be formed from several parts. The machine tool, preferably at the end of the tool arrangement opposing the electric drive unit, comprises a tool holder of which the drive axis can also be arranged angularly deviated with respect to the drive axis of the electric drive element. Generally, the tool holder can be arranged at an outer end of the drive axis, it can, however, also be arranged in a region spaced from the end of the tool arrangement. Exemplarily, the tool holder can also be arranged in a recess in the area of the driveshaft within the tool arrangement, in which a tool can be inserted. Preferably, tools deployable with the machine tool serve for cutting, grinding, sawing, drilling, grating, or for other cutting, abrasive o transforming processing steps.

A preferred embodiment of the electric drive unit extends essentially along a longitudinal axis, which coincides with the axis of rotation of the driveshaft of the electric drive unit. On the driveshaft, the anchor with the anchor coils is arranged, which rotate within a stator with an associated pole package. Thereby, the driveshaft of the electric drive unit drives the driveshaft of the machine tool. The collector, which is also designated as commutator, is preferably arranged at the second end of the electric drive unit at the driveshaft. That collector serves the supply and switching of electrical current, particularly of line current or of current from a device for supplying electrical energy, as particularly a secondary battery, to the electric drive arrangement. It is understood, however, that the fan arrangement can also be used with every differently built electric drive unit, particularly rotatively driving a driveshaft and adapted for driving the tool arrangement.

The defined outer contour of electric drive arrangement and tool arrangement preferably results essentially from the form of these drive elements, which is influenced particularly by their drive function and by requirements of an advantageous guiding of the cooling air flowing by.

The defined inner contour of the outer housing follows, preferably at least region wise, the defined outer contour of the electric drive arrangement and—insofar as the outer housing surrounds this electric drive arrangement—of the tool arrangement. Thereby, the outer contour and the inner contour with the exception of the regions of the first and second support devices comprise a minimum spacing from each other of particularly between 1 mm and 3 mm. The predetermined minimum spacing between the outer contour and the inner contour results in a mechanical decoupling of the housing from the drive arrangements and in addition forms a clear spacing which can be flowed through by cooling air.

In a preferred embodiment of the hand-held machine tool, for adherence of the minimum spacing between the outer contour between the electric drive unit and the tool arrangement as well as the inner contour of the outer housing, a number N of first support devices at the outer contour of electric drive unit and tool arrangement as well as a number N of second support devices at the inner contour of the outer housing is provided. The first support devices and the second support devices thereby cooperate such that they keep the outer contour and the inner contour at this minimum spacing from one another.

By this cooperation of the first and second support devices, the inner contour and thereby the outer housing and particularly the gripping region of the hand-held machine tool are kept at a distance of the outer contour and thereby at a distance of the electric drive unit and of the tool arrangement. By this mechanical decoupling, particularly the transmission of vibration of the drive elements to the housing is reduced. The first and second support devices facilitate a sufficient transmission of support forces as the guiding forces from the user to the machine tool and the processing forces from the tool to the user.

At the outer contour of the drive elements, a number N of first support devices is arranged, and at the inner contour of the outer housing, a number N of second support devices is arranged. Thereby, a first support device cooperates with one second support device respectively, that the outer contour and the inner contour—with the exception of the first and second support devices—possess a predetermined minimum spacing from one another at every position.

The number N results particularly from the design of the first and second support devices. The geometric design of the drive elements and the outer housing has a further influence on the number N of the support devices. Furthermore, it is preferred to particularly arrange the support devices such that they constitute no essential flowing resistance for the guiding of cooling air through the machine tool.

The outer housing of the machine tool extends along a longitudinal axis of the machine tool. The tool arrangement is arranged at a first end portion of the outer housing, preferably at a first ending of the electric drive arrangement. The outer housing extends preferably along the electric drive unit to at least one second end portion of the outer housing, which is preferably arranged from a second end of the electric drive unit at an end of the machine tool opposing the tool arrangement. At this end portion, at least one inlet opening for cooling air is arranged. Depending on the requirement of cooling air of the machine tool, also two or more adequately calculated inlet openings for the inflow of air from the surrounding can be arranged. The arrangement of this at least one inlet opening for cooling air at an end of the machine tool opposing the tool arrangement is preferred, since then the at least one inlet opening is arranged spaced apart from the area in which the processing tool is inserted and, as a result of processing steps, in which chips, dust and similar reside in the surrounding air, which should not end up in the inner of the machine tool together with the cooling air.

For the generation of air suction for the inlet of cooling air through the at least one inlet opening into the machine tool, a fan arrangement is provided, which is preferably arranged coaxially with the electric drive unit and preferably directly driven by said electric drive unit. Thereby it is provided that on the one hand this fan arrangement is designed and arranged in this way and on the other hand the electric drive unit, the tool arrangement and the inner contour of the inner housing are designed such that the cooling air fed in by the fan arrangement flows through the machine tool and at the outer contour of the tool arrangement essential parallel with the axis of rotation of the electric drive unit to the outside from the outer housing.

In a preferred embodiment of the hand-held machine tool, the electric drive unit can be flowed through by cooling air into the direction of its longitudinal axis. The electric drive unit, thereby, is preferably formed such that it comprises clear spacing within its interior, particularly in the direction of its axis of rotation, which can be flowed through by cooling air. Preferably, the electric drive unit in the area of its end averted from the tool arrangement comprises at least one preferably axially arranged inflow opening in which cooling air can flow in preferably parallel with the axis of rotation of the electric drive unit. If the electric drive unit is constructed according to the embodiment previously described as preferred, and can be flowed through by cooling air in its longitudinal direction, the cooling air flowed in through the at least one inlet opening at this end of the electric drive arrangement preferably smears the collector and/or carbon brushes arranged there or an electric commutation arrangement, the rotor and the stator of the electric drive arrangement and thereby absorbs heat energy from these components.

In a further preferred embodiment of the hand-held machine tool in which the electric drive unit can be flowed through by cooling air in the direction of its longitudinal axis, said machine tool preferably comprises clear spacing that can be flowed through by cooling air within its interior, particularly in the direction of its axis of rotation. Preferably, the electric drive unit comprises at least one preferably arranged inflow opening preferably arranged in the direction of the flow in front of the collector and particularly in front of the carbon brushes, in the area of the collector, particularly in the area of coal brushes arranged there, such that the cooling air can essentially smear the collector and particularly the carbon brushes.

In a further preferred embodiment of the hand-held machine tool, in which the electric drive unit can be flowed through by cooling air in the direction of its longitudinal axis, said machine tool comprises clear spacing, preferably within its interior that particularly can be flowed through by a cooling air in the direction of its axis of rotation. Preferably, the electric drive unit comprises a pole package at the rotor and/or at the stator, wherein in the area of this pole package, preferably in front of this pole package in the direction of the flow, at least one preferably radially arranged inflow opening for cooling air is provided, such that the cooling air flowing by can essentially smear the pole packages of rotor and/or stator.

In a further preferred embodiment of the hand-held machine tool, preferably behind the stator in the direction of the flow at least one preferably radially arranged inflow opening for cooling air is provided. In this embodiment, the heat energy produced in the outer area of the electric drive unit, particularly within the pole package of the stator, is collected by a flow of cooling air flowing between the outer contour of the electric drive unit and the inner contour of the outer housing. After smearing the outer contour of the electric drive unit, particularly in the area of the pole package, the cooling air is guided through this inflow opening, preferably into the interior of the electric drive unit, and there from to the fan arrangement.

In a construction type of the electric drive unit different from the previously described preferred embodiments, the at least one inflow opening is equally to be arranged such that the flow of cooling air into the interior of the electric drive unit is guided in order to collect heat energy from the components of the electric drive arrangement. Thereby, is is also preferred to provide more than one inflow openings arranged one after another in longitudinal direction, in order to dissipate heat energy from the components of the electric drive arrangement to preferably several flows of cooling air.

For guiding the flow of cooling air from the inlet openings of the outer housing to the fan arrangement in a way that it is guided essentially parallel with the longitudinal axis of the outer housing in the outer and inner area of the electric drive unit, it is preferred that the outer cross section of the electric drive unit enlarges along its axis of rotation in the direction towards the tool arrangement after at least one inflow opening for cooling air. At such a cross section enlargement after an inlet opening in the direction of the flow, part of the cooling air flowing along the outer contour of the electric drive unit can be guided into the interior of the electric drive unit without forming an essential flow resistance for the cooling air flowing along the inner contour of the outer housing.

Furthermore, it is preferred to form such inflow openings for cooling air such that the air flowing by said inflow openings is at least partially guided towards the electric drive arrangement. Particularly in cooperation with an enlargement of the outer cross section of the drive arrangement to be cooled, such an efficient flow guidance of the cooling air can thus be attained, without creating flow obstacles affecting the performance of the fan arrangement.

Thereby, it is preferred that the drive elements arranged in front of the fan arrangement in the direction of the flow, and particularly the electric drive arrangement, are formed such that the pressure gradient for a flow of the cooling air particularly towards the interior of the electric drive arrangement is larger than for a flow of the cooling air towards the clear spacing that surrounds the electric drive unit at its outer contour and is formed by the minimum spacing between the inner contour of the outer housing and the outer contour of the drive elements.

In a preferred embodiment of the hand-held machine tool, the fan arrangement is arranged coaxially at the first end of the electric drive arrangement. Thus, the fan arrangement is positioned in an area between the electric drive arrangement and the tool arrangement which is essentially rigidly coupled to the electric drive unit. In a preferred embodiment, the fan arrangement is formed such that it draws in the cooling air essential parallel with the axis of rotation of the electric drive arrangement. Preferably, the fan arrangement comprises a fan wheel rotating around the axis of rotation of the electric drive arrangement. Thus, the fan arrangement guides the cooling air particularly through at least one inflow opening towards the interior of the electric drive arrangement and subsequently towards the fan wheel.

After flowing through the fan arrangement and particularly through the fan wheel, the flow of cooling air is guided to the inner contour of the outer housing, particularly by the geometry of the fan wings of the fan wheel itself. In an alternative embodiment, the air guidance can also be supported by guidance arrangements. In combination with the velocity and the direction of the inflow of cooling air into the clear spacing of the inner contour of the outer housing and the outer contour of the tool arrangement, the flow of cooling air there from is preferably guided-on essentially in the first direction parallel with the longitudinal axis of the machine tool and thereby preferably additionally so collects heat energy from the tool arrangement.

The diameter of the fan wheel thereby preferably approximately corresponds to the cross section of the electric drive arrangement at its end facing the fan arrangement. Thereby, the fan arrangement preferably comprises a housing open towards the tool arrangement in order to possibly not affect a flowing-out of cooling air into the clear spacing of the outer contour of the fan arrangement and the inner contour of the outer housing. The housing of the fan arrangement is thereby preferably equally essentially rigidly coupled to the electric drive arrangement and the tool arrangement.

By the minimum spacing between the outer contour of the tool arrangement and the inner contour of the outer housing, the clear spacing located in-between is open towards the environment, where the outer housing ends in the area of the tool arrangement. The at least one air outlet opening resulting therefrom facilitates an outflow of cooling air out of the outer housing.

In a preferred embodiment, at the first end portion of the outer housing a boundary area is arranged, which is formed into the direction of the tool arrangement, which however at the same time keeps the minimum spacing between the outer housing and the outer contour of the tool arrangement. Thereby, the boundary area is particularly formed aerodynamically efficient so that the cooling air can flow into free space preferably widely unobstructed. The boundary area directed towards the inside thereby preferably on the one hand serves as a blind but on the other hand also as a safety arrangement, which prevents the penetration of objects from the tool arrangement. Such objects could particularly obstruct the outflow of cooling air on the one hand and thereby lead to an overheating of the machine tool; on the other hand by an object located in the clear spacing of the tool arrangement and the outer housing a mechanical impairment of the function of the fan wheel could be effectuated, which could as a consequence also lead to an overheating of the machine tool.

The cooling air exiting at the outer contour of the tool arrangement preferably flows away from the processing person into the direction of the tool holder and thus supports the flowing away of the surrounding air polluted as a consequence of processing steps with chips, dust and similar. At the same time, the cooling air warmed-up during flowing through the machine tool is guided away from the processing person.

At the outer contour of the machine tool, preferably out of the area covered by the outer housing, preferably at least one air guidance arrangement is arranged, which is particularly forms such that it fulfills an air guidance function and/or a heat dissipation function in the sense of a cooling fin. The cooling air, which flows out along the outer contour of the tool arrangement, is thereby preferably guided further along the outer contour of the tool arrangement and can thus preferably collect additional heat energy from the tool arrangement and thereby cool it.

In a preferred embodiment, the fan arrangement is, particularly with respect to its geometry, arrangement and number of rotation, formed such and particularly cooperates with the inner contour of the outer housing as well as with the geometry of the electric drive unit, that 75% of the cooling air flow, preferably 80% of the cooling air flow, and especially preferably 90% of the cooling air reaching the area of the outer housing through the inlet opening, flow through the electric drive unit.

Further advantages, features and applications of the present invention result from the following description in context with the figures.

It is shown in.

Figure 1:
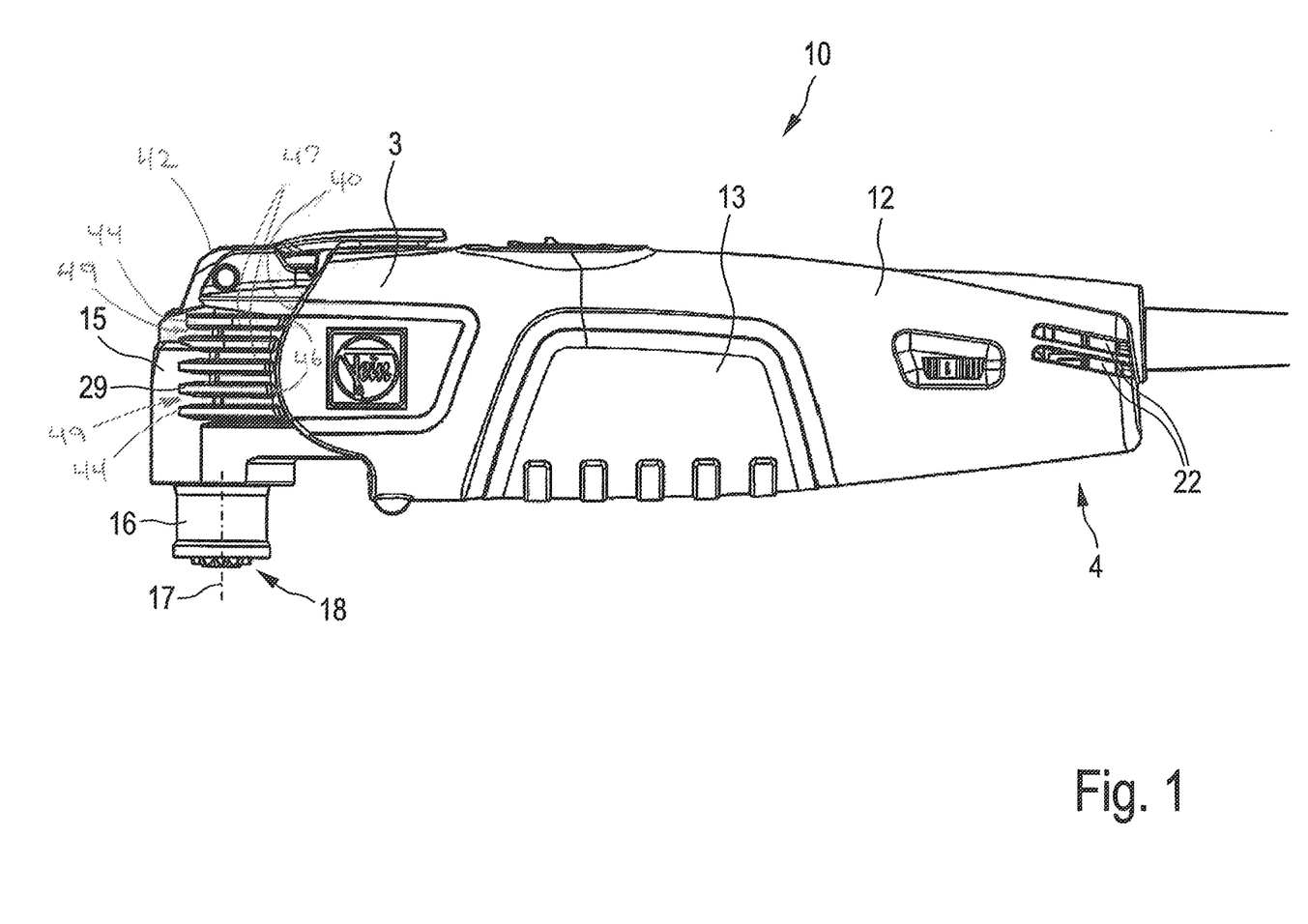
FIG. 1: an exemplary hand-held machine tool according to the present invention.

FIG. 1 shows an exemplary hand-held machine tool 10 according to the present invention, which is carried out as an oscillation machine tool. The outer housing 12 comprises a defined inner contour and consists of two housing halves, the parting line of which runs vertically, i.e. parallel with the depicted figure plane through the longitudinal axis of the machine tool 10. In the second end portion 4 of the outer housing 12, which opposes tool arrangement 15, an air inlet opening 22 is arranged in each of the housing halves, wherein the air inlet opening 22 is formed from two parts in the depicted exemplary embodiment. Furthermore, the outer housing 12 comprises a gripping region 13 which the user encompasses during guiding the machine tool. The outer housing 12 surrounds an electric drive unit 14 which drives the machine tool 10 as well as a portion of tool arrangement 15 arranged in a first end portion 3 of the outer housing 12. The tool arrangement 15 comprises a driveshaft 16 oscillating around a drive axis 17, wherein the drive axis 17 is arranged downwardly deviated 90° with respect to the axis of rotation of the electric drive unit, which coincides with the longitudinal axis of the machine tool in the exemplary embodiment. At the end of driveshaft 16, a tool holder 18 for receiving a fitting processing tool is arranged.

Figure 2:
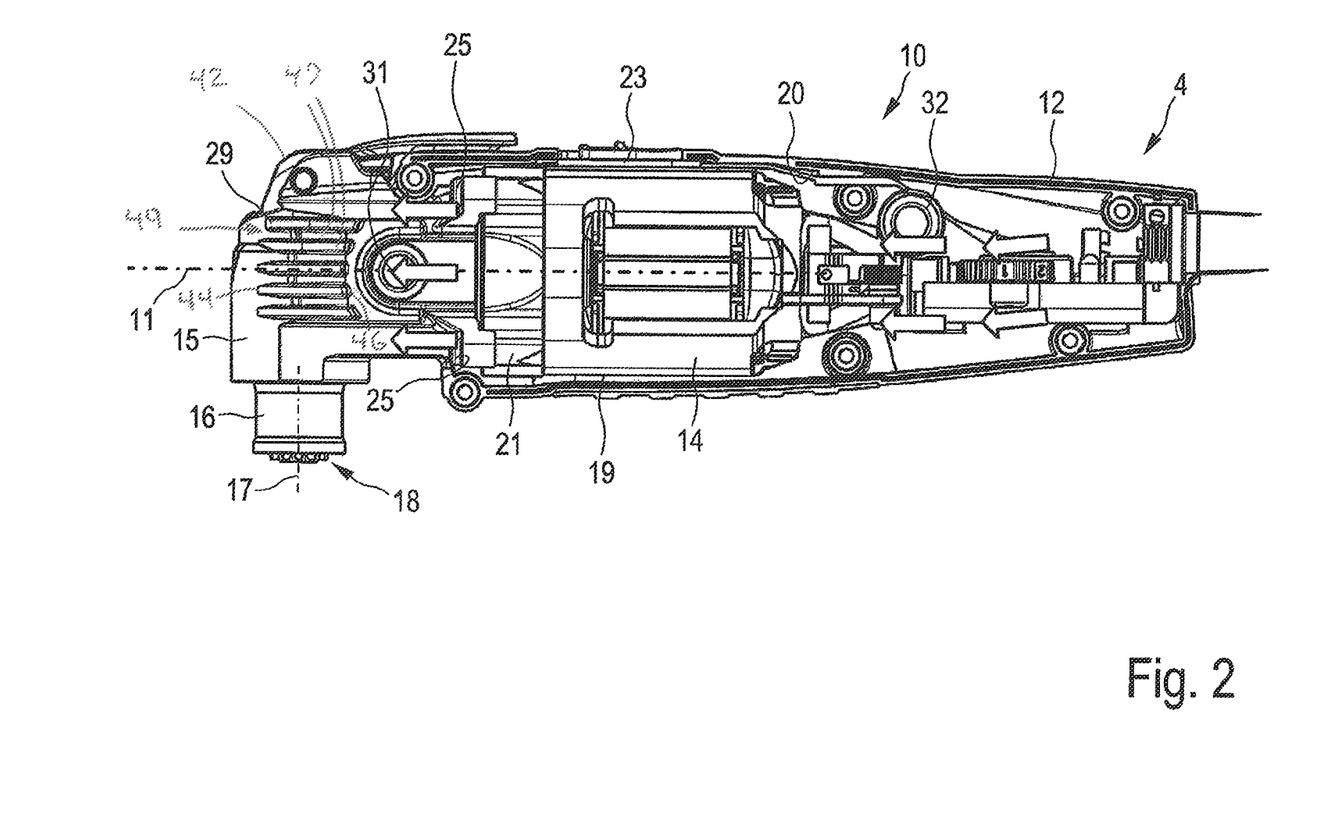
FIG. 2: the exemplary hand-held machine tool without the front outer housing half shell.

FIG. 2 shows the exemplary hand-held machine tool 10 from FIG. 1, wherein the front half shell of the outer housing 12 is not depicted. The drive elements of the machine tool 10 are depicted in this representation, particularly the electric drive arrangement 14 as well as the tool arrangement 15 joined thereto in a widely fixed unit by means of screw connections 25. Between electric drive arrangement 14 and tool arrangement 15, a fan arrangement 21 is arranged. The fan arrangement 21, by means of screw connections 25, is likewise rigidly connected both with the electric drive arrangement 14 and the tool arrangement 15. The three elements form a mechanically coupled rigid unit.

The electric drive unit 14, the fan arrangement 21 and the tool arrangement 15 comprise a defined outer contour 19, insofar as these are arranged in the area of outer housing 12. In the representation of FIG. 2 it is also recognizable that the boundary of the rear half shell, which forms the parting line of outer housing 12 and thereby also a part of inner contour 20 of the outer housing 12, is arranged in a distance A from the drive elements of tool machine 10. Hereby, a clear spacing 23 between the inner contour 20 and the outer contour 19 results, which can be flowed through by cooling air.

At the area accommodated in the outer housing 12 (not shown in FIG. 2), a first support device 31 is arranged at the tool arrangement 15. A further first support device 32 is arranged at the rear portion of the electric drive unit 14. At the same position, on the concealed opposing side of the tool arrangement 15 and the electric drive unit 14, also first support devices 31 and 32 are arranged.

In the sectional representation depicted in FIG. 2, grey arrows are drawn in, which symbolize the flow of cooling air. In the rear portion of the outer housing 12 and thereby in the second end portion 4 of the outer housing 12 extending from the electric drive unit 14 towards the rear, at least on inlet opening 22 is arranged. The cooling air entering through the inlet opening 22 flows widely unobstructed via the control and switching arrangements arranged behind electric drive arrangement 14. The course of flow of cooling air through the machine tool 10 in the area of the electric drive arrangement 14 is elucidated closer in the following in connection with FIG. 3. In the area of tool arrangement 15, within clear spacing 23 the cooling air is guided along the outer contour 19 of the tool arrangement 15 and out of the outer housing 12. At the outer contour of the area of the tool arrangement 15 protruding from the outer housing 12, cooling and guiding arrangements 29 are arranged.

Figure 3:
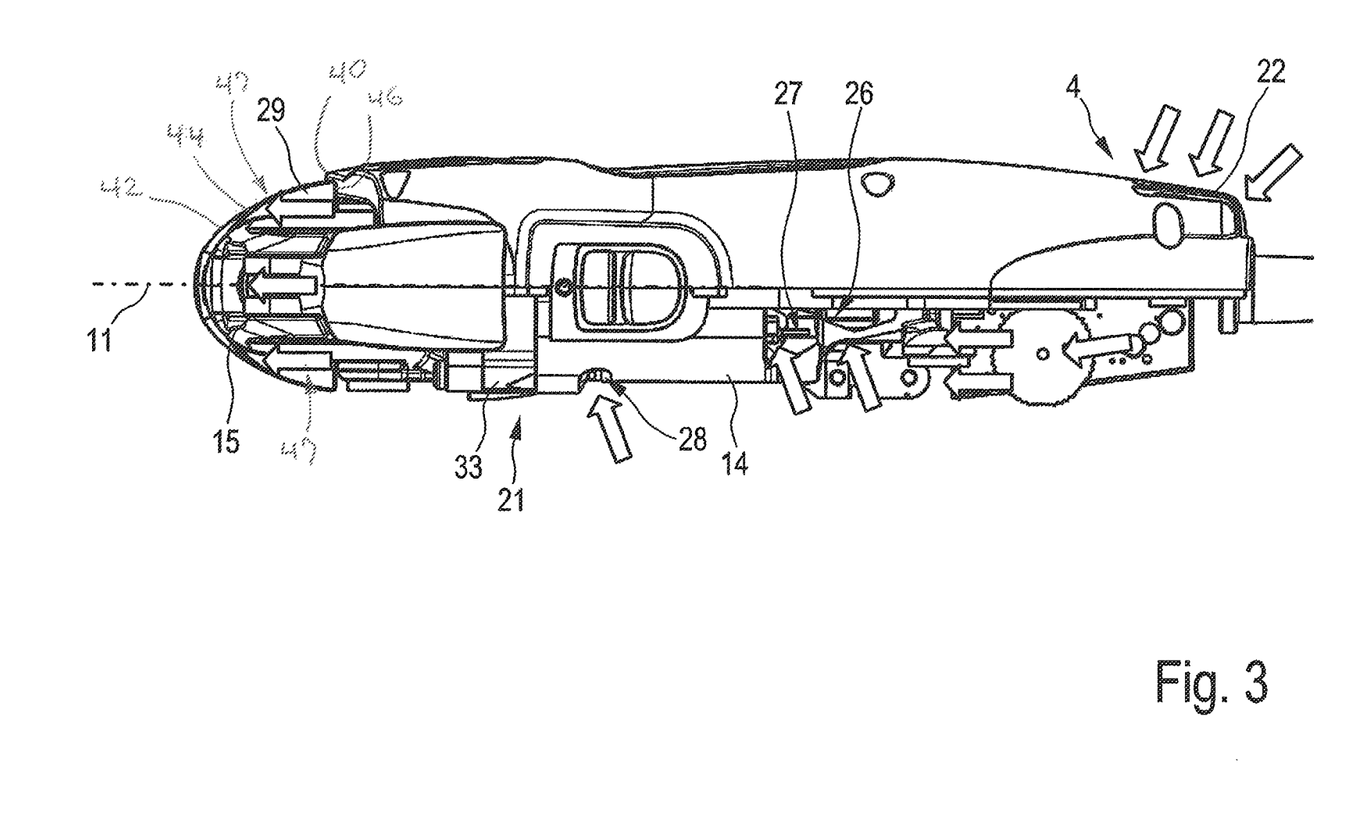
FIG. 3: a view from above onto the exemplary hand-held machine tool without the front outer housing half shell.

FIG. 3 shows a view from above onto the machine tool, wherein the front housing shell is not depicted. The air flow elucidated in connection with this figure, however, corresponds to the flow that appears when both housing shells are completely assembled. Fan arrangement 21 arranged between electric drive arrangement 14 and tool arrangement 15 produces an airflow aligned essentially parallel with drive axis 11 during the operation of electric drive arrangement 14, whereby surrounding air is drawn in through the inlet opening 22 arranged in the second end portion 4 of outer housing 12. As suggested by arrows in this figure, this said surrounding air is initially guided via the control and switching arrangements arranged behind the electric drive arrangement 14. The cooling air flowing through the housing parallel with the longitudinal axis due to the effect of the fan arrangement 21, axially flows along the rear end of the electric drive arrangement 14. A first part of this cooling air enters through at least one inflow opening 26 for cooling air arranged radially in the area of the collector at the outer contour of the electric drive arrangement 14. The cooling air entering through the inflow opening 26 into the electric drive arrangement 14 smears the collector and thereby collects heat energy from them.

A further part of the cooling air flowing through the outer housing 12 of the machine tool 10 enters through at least one inlet opening 27 for cooling air in the electric drive unit 14, which is arranged at their outer contour in the area between the collector and the pole packages of rotor and stator. This air flow as well as the air flow entering through the inflow opening 26 into the electric drive unit 14 are guided through the interior of the electric drive unit 14 and now collect heat energy there, particularly from the pole packages of rotor and stator. The portion of the air flow, which is guided past the inflow openings 26 and 27, is guided past the outer contour of the electric drive unit 14 in the clear spacing 23 and collects heat energy from the outer side of the electric drive unit 14. A further portion of the cooling airflow, flowing through the outer housing 12, is guided through at least one inlet opening 28 into the electric drive unit 14 in longitudinal direction behind the pole packages, as suggested by the arrow depicted there. Thereby, this cooling airflow collects heat energy from the front face side of the pole packages of rotor and stator.

The exemplarily embodiment of the hand-held machine tool 10 is furthermore formed such that a remaining portion of the cooling airflow flows past outside the fan arrangement 21 through the clear spacing 23 between the inner contour 20 of the outer housing 12 and the outer contour 19 of electric drive unit 14 and fan arrangement 21.

In the exemplary embodiment of the electric drive unit 14, its outermost cross section increases after each inlet opening 26 and 28, so that electric drive unit 14 comprises a staged outer contour 19. In cooperation with the accordingly formed inner contour 20 of the outer housing 12, the flow resistance in this way increases after each inlet opening 26 and 28, whereby the cooling air is guided towards the interior of the electric drive unit 14 according to the lower flow resistance there. Furthermore, the inlet openings 26 and 28 are formed aerodynamically efficient such that the cooling air is deflected at it such that thereby no flow resistance obstructing the flow is formed.

After flowing through or around of the electric drive unit 14, the cooling airflow is guided towards fan wheel 30 of the fan arrangement 21 concealed in FIG. 3. The fan arrangement 21 of the exemplary embodiment is formed such that the fan wheel 30 draws in the cooling airflow parallel with the axis of the fan wheel corresponding to the drive axis respectively the axis of rotation 11 of the electric drive unit 14. Fan wheel 30 is at least partially surrounded by a fan wheel housing 33 of the fan arrangement 21. This fan wheel housing 33 is formed such that it guides away the cooling air after flowing through fan wheel 30 in the radially outer area of the fan arrangement 21 essentially axially from the fan arrangement 21. The cooling airflow flowing away from the fan arrangement 21 unites with the part of the cooling airflow that does not enter the electric drive unit 14 during flowing through tool machine 10 but flows along the outer housing 12 in outer contour 19 and inner contour 20 in the clear spacing 23.

The cooling airflow now reunited after fan arrangement 21 flows further in the clear spacing 23 at the outer contour 19 of the tool arrangement 15, where it exits therefrom at the end of the outer housing 12 and is guided further along outer contour 19 of the tool arrangement 15 by the cooling and guiding arrangements 29 arranged there, and thereby collects heat energy of tool arrangement 15.

As shown in FIGS. 1 and 3, the first end portion of the outer housing 12 has a forward end 40 where the cooling air emerges from the clear spacing 23. The cooling and guiding arrangements 29, which are located on the area 42 of the tool arrangement 15 protuding from the outer housing 12, are configured as ribs. The ribs 29 have forward ends 44 spaced from the outer housing 12, rearward ends 46 at the forward end 40 of the outer housing 12, and linear configurations parallel to the longitudinal axis 11 fully from the rearward 46 ends to the forward ends 44. The ribs 29 thus define parallel linear airflow channels 47 with open forward ends 49 for discharging the air in directions parallel to the longitudinal axis 11.

Figure 4:
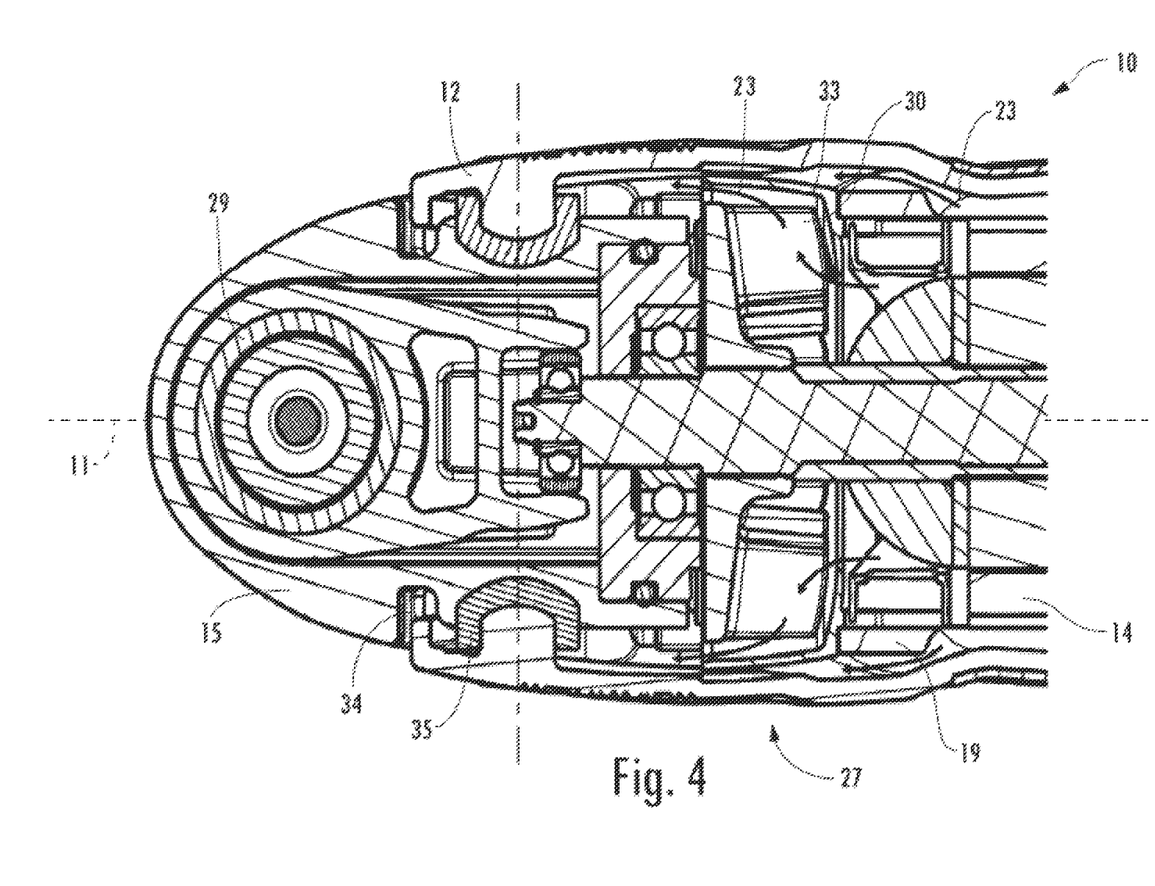
FIG. 4: a view from above onto a section through the front part of the exemplary hand-held machine tool.

FIG. 4 shows a view from above on the section through the front part of the exemplary hand-held machine tool 10, wherein the section runs through the drive axis 11 of the machine tool. In this sectional view, fan wheel 30 of the fan arrangement 21 is shown, as well as the fan wheel housing 33 of the fan arrangement 21 is depicted in the section. By means of arrows, the detection of the cooling airflow after flowing through the fan wheel 30 in the fan wheel housing 33 is suggested as well as the reunification of the cooling airflows flowing through the interior and along the outer contour 19 of the electric drive arrangement 14 in the clear spacing 23. At the front end of the outer housing 12, a boundary area 35 directed inside is shown, which engages in a recess 34 formed at the cooling and guiding arrangements 29 of the tool arrangement 15. The boundary area 35 and the outer contour of the tool arrangement 15 comprise a minimum spacing from one another in the area of the recess 34.

The invention claimed is:

1. A handheld machine tool comprising:
an outer housing extending essentially along a longitudinal axis and having a gripping region extending along the longitudinal axis for engaging and guiding the tool by means of a hand of a user;
an electric drive unit within the outer housing for rotatively driving a driveshaft of the tool, wherein the axis of rotation of the driveshaft is essentially aligned parallel to the longitudinal axis of the outer housing or coincides with said longitudinal axis; and
a tool arrangement which is essentially rigidly coupled to the electric drive unit and which has an area protruding outward from a first end portion of the outer housing, wherein:
the outer housing has a defined inner contour;
the electric drive unit has a defined outer contour opposite the inner contour of the outer housing, and has an air inlet opening at the outer contour;
the outer contour and the inner contour are spaced apart from one another to define a clear spacing for air to flow between the electric drive unit and the outer housing in an axial direction;
an inlet opening for cooling air is arranged at a second end portion of the outer housing;
a fan arrangement driven by the electric drive unit is provided which drives a flow of cooling air from the inlet opening at the second end portion of the outer housing into the electric drive unit through the air inlet opening at the electric drive unit, and also drives a flow of cooling air from the inlet opening at the second end portion of the outer housing past the electric drive unit axially through the clear spacing; and
the electric drive unit has an outermost cross section that enlarges after the air inlet opening to provide an axially staged outer contour that increases the flow resistance through the clear spacing past air inlet opening;
the first end portion of the outer housing has a forward end where the cooling air emerges from the clear spacing in a forward direction over the protruding area of the tool arrangement; and
the protruding area of the tool arrangement has guiding arrangements in the form of ribs having forward ends spaced from the outer housing, rearward ends at the forward end of the outer housing, and linear configurations parallel to the longitudinal axis fully from their rearward ends to the forward ends, whereby the ribs define parallel linear air flow channels with open forward ends for discharging the air in directions parallel to the longitudinal axis.

2. The tool according to claim 1, characterized in that the electric drive unit can be flowed through by cooling air in the direction of its axis of rotation.

3. The tool according to claim 1, characterized in that the electric drive unit comprises an inflow opening for cooling air in the area of the collector.

4. The tool according to claim 1, characterized in that the electric drive unit comprises a pole package, in front of which at least one inflow opening for cooling air is arranged.

5. The tool according to claim 4, characterized in that the electric drive unit comprises at least one inflow opening for cooling air after the pole package.

6. The tool according to claim 1, characterized in that at a first end of the electric drive unit and co-axially to it, the fan arrangement is arranged which draws in the cooling air essentially parallel to the axis of rotation of the electric drive unit.

7. The tool according to claim 6, characterized in that the cooling air is guided between the outer contour of tool arrangement and the inner contour of outer housing after flowing through the fan arrangement.

8. The tool according to claim 1, characterized in that the fan arrangement with respect to its geometry, arrangement and number of rotation is formed and particularly cooperates with the inner contour of outer housing as well as with the geometry of the electric drive unit such that 75% of the cooling airflow flows through the electric drive unit.

9. The tool according to claim 1 wherein the tool arrangement is an oscillating tool arrangement.

* * * * *